US012587792B2

(12) United States Patent
Gao et al.

(10) Patent No.: US 12,587,792 B2

(45) Date of Patent: Mar. 24, 2026

(54) SOUND DEVICE

(71) Applicant: AAC Microtech (Changzhou) Co., Ltd., Changzhou (CN)

(72) Inventors: Zhongfeng Gao, Changzhou (CN); Jingwei Yu, Changzhou (CN); Siyuan Ni, Changzhou (CN); Qibo Li, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 308 days.

(21) Appl. No.: 18/325,087

(22) Filed: May 29, 2023

(65) Prior Publication Data

US 2024/0284112 A1 Aug. 22, 2024

Related U.S. Application Data

(63) Continuation of application No. PCT/CN2023/076314, filed on Feb. 16, 2023.

(51) Int. Cl.

| | |
|---|---|
| ***H04R 9/04*** | (2006.01) |
| ***H04R 3/00*** | (2006.01) |
| ***H04R 7/12*** | (2006.01) |
| ***H04R 7/18*** | (2006.01) |
| ***H04R 9/02*** | (2006.01) |
| ***H04R 9/06*** | (2006.01) |

(52) U.S. Cl.

CPC ............... *H04R 9/045* (2013.01); *H04R 3/00* (2013.01); *H04R 7/127* (2013.01); *H04R 7/18* (2013.01); *H04R 9/025* (2013.01); *H04R 9/06* (2013.01); *H04R 2400/11* (2013.01)

(58) Field of Classification Search

CPC .................................. H04R 7/18; H04R 7/127

See application file for complete search history.

(56) References Cited

U.S. PATENT DOCUMENTS

2017/0180865 A1 * 6/2017 Fujitani .................... H04R 9/06

FOREIGN PATENT DOCUMENTS

| | | | | |
|---|---|---|---|---|
| CN | 1620839 A * | 5/2005 | .............. | H04M 1/03 |
| WO | WO-2011004479 A1 * | 1/2011 | ............... | H04R 9/06 |

* cited by examiner

*Primary Examiner* — Carolyn R Edwards
*Assistant Examiner* — Dylan Maguire Neece
(74) *Attorney, Agent, or Firm* — Wiersch Law Group

(57) ABSTRACT

The present disclosure discloses a sound device including a frame, a magnet system, and a vibration system; the vibration system includes a diaphragm and a coil fixed to the diaphragm; the diaphragm includes a rectangular dome and an edge surrounding the dome; the dome includes a first protrusion, a second protrusion and a third protrusion recessed towards the coil; the first protrusion extends along a long axis of the dome; the second protrusion extends along a short axis of the dome; two ends of the third protrusion connects with the first protrusion and the second protrusion, respectively; the coil is fixed to the first protrusion and the second protrusion. The third protrusion is located at the corner position and in an arc shape. The third protrusion can effectively reduce the risk of fracture of the dome during vibration deformation and improve the stability of the sound device.

7 Claims, 4 Drawing Sheets

SOUND DEVICE

FIELD OF THE PRESENT DISCLOSURE

The present disclosure relates to electric-acoustic technologies, especially relates to a sound device applied in portable mobile terminals.

DESCRIPTION OF RELATED ART

With the development of the portable mobile terminal technologies, users have increasingly high requirements for the sound quality of portable mobile terminals. And a sound device in portable mobile terminals is one of the necessary conditions to achieve this high-quality sound effect.

In related art, the sound device includes a frame and a vibration system and a magnet system mounted on the frame. The vibration system includes a diaphragm configured to generate sound, and a coil fixed to the diaphragm and driving the diaphragm. The bond strength is prone to reduce owing to the deformation of diaphragm during vibrating, thus reducing the vibration stability of the coil. Therefore, a coil frame is usually provided to suspend the coil into a magnetic gap of the magnet system, but increasing cost of the sound device. In order to decrease cost and ensure the vibration stability of the voice coil without the coil frame, a protrusion is provided on a dome of the diaphragm to be fixed to the coil, thereby providing support and fixation. However, when a height of the protrusion on the dome is relatively high, there is a high risk of fracture during deformation and stretching, which affects the reliability of the sound device.

Therefore, it is necessary to provide an improved sound device to overcome the problems mentioned above.

SUMMARY OF THE INVENTION

One object of the present disclosure is to provide a sound device with higher reliability and lower cost.

The sound device includes a frame; a magnet system having a magnetic gap, including a yoke fixed to the frame; and a magnet fixed to the yoke; a vibration system mounted on the frame, including a diaphragm fixed to the frame; and a coil fixed to the diaphragm and inserted into the magnetic gap; wherein the diaphragm includes a rectangular dome and an edge surrounding the dome; the dome includes a first protrusion, a second protrusion and a third protrusion recessed towards the coil; the first protrusion extends along a long axis of the dome; the second protrusion extends along a short axis of the dome; two ends of the third protrusion connects with the first protrusion and the second protrusion, respectively; the coil is fixed to the first protrusion and the second protrusion.

As an improvement, the third protrusion is located at the corner position and in an arc shape.

As an improvement, the dome includes four third protrusions; the third protrusion is located between adjacent first protrusion and the second protrusion.

As an improvement, a concave depth of the third protrusion along a vibration direction is smaller than a concave depth of the first protrusion and a concave depth of the second protrusion along the vibration direction.

As an improvement, the first protrusion, the second protrusion and the third protrusion are enclosed in a rectangular shape.

As an improvement, the magnet includes a main magnet located in a central position and a side magnet spaced apart from the main magnet forming the magnetic gap.

As an improvement, the magnet system further included a main pole plate fixed to the main magnet and a side pole plate mounted on one side of the side magnet facing the diaphragm; the side pole plate is fixed to the frame to support the magnet system.

As an improvement, the magnet system includes four side magnets spaced apart from each other; the vibration system further comprises a support diaphragm fixed one end of the coil away from the diaphragm; the support diaphragm is arranged between adjacent two side magnets.

As an improvement, the vibration system further includes a FPC located on one side of the support diaphragm facing the diaphragm; the FPC includes a first fixation portion located outside the coil, a second fixation portion fixed to the frame and an elastic portion connecting the first fixation portion with the second fixation portion.

As an improvement, the vibration system includes four FPCs; two solder pads are separately provided on two first fixation portions of the FPCs.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
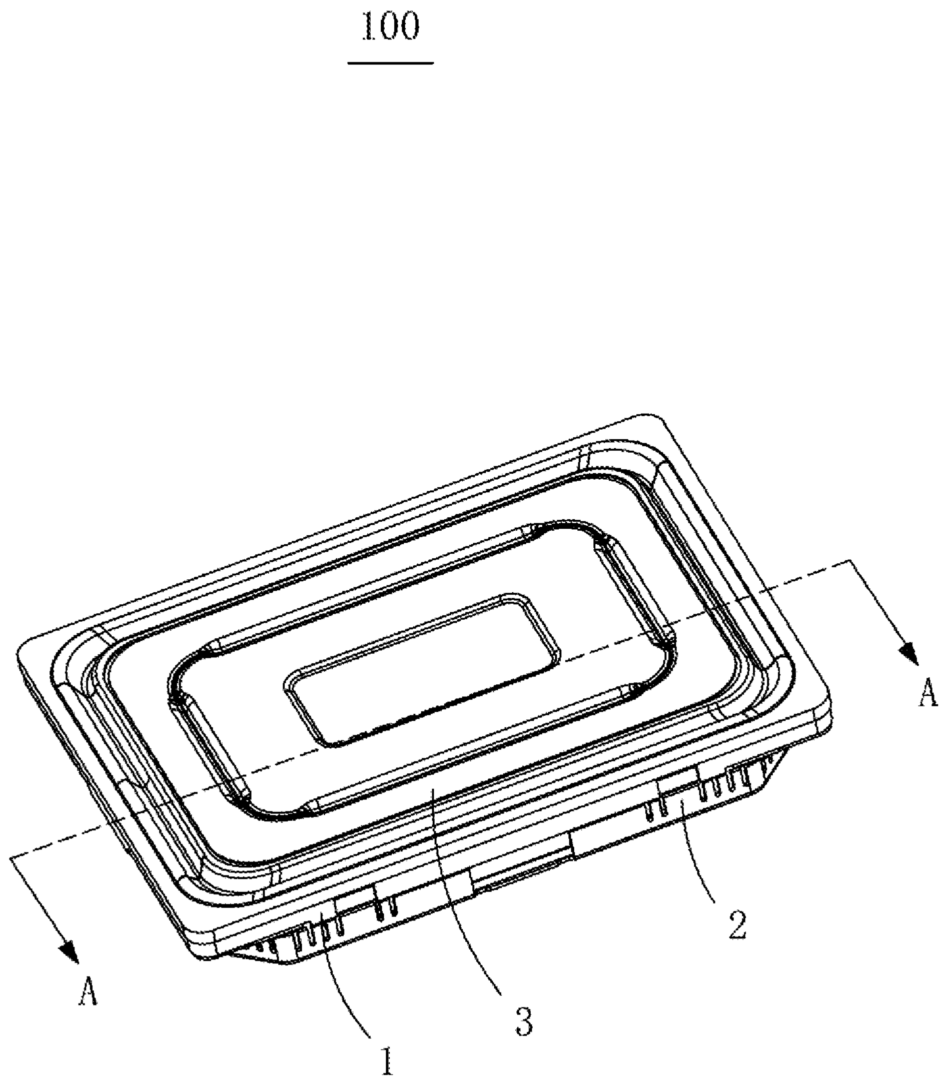
FIG. 1 is an isometric view of a sound device in accordance with an exemplary embodiment of the present disclosure.
Figure 2:
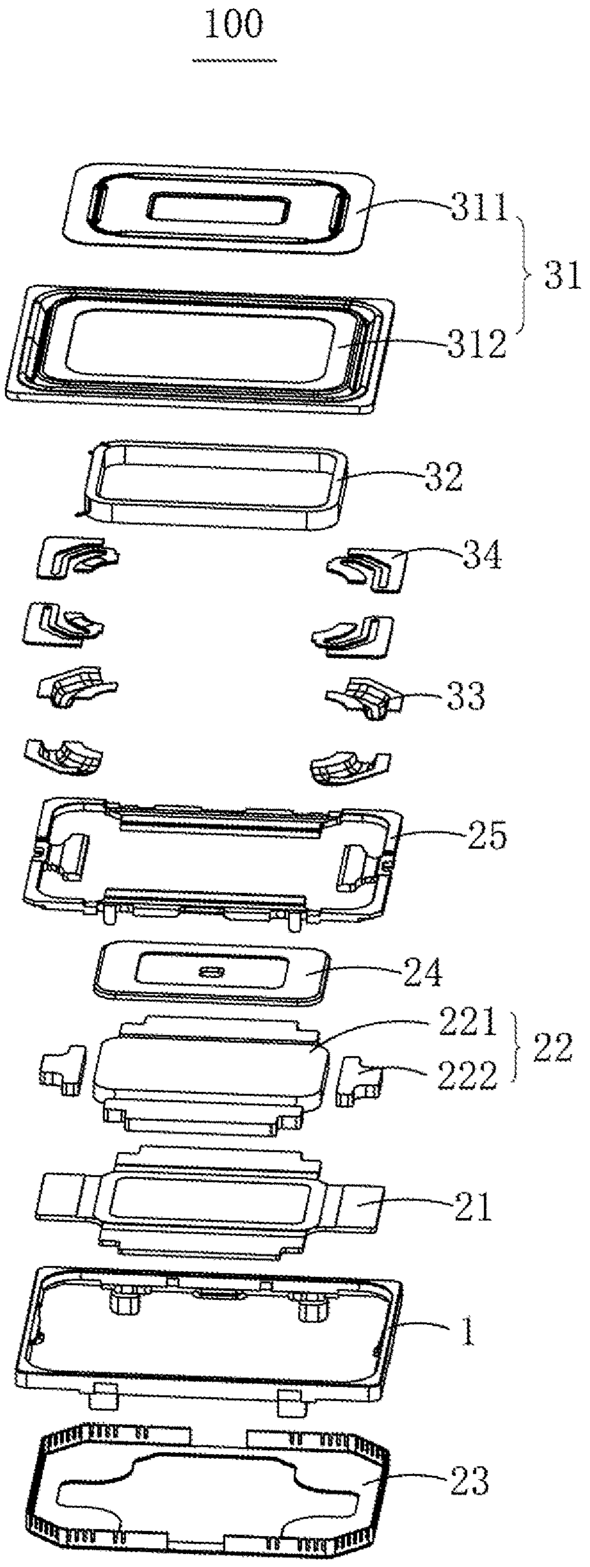
FIG. 2 is an exploded view of the sound device in FIG. 1.
Figure 3:
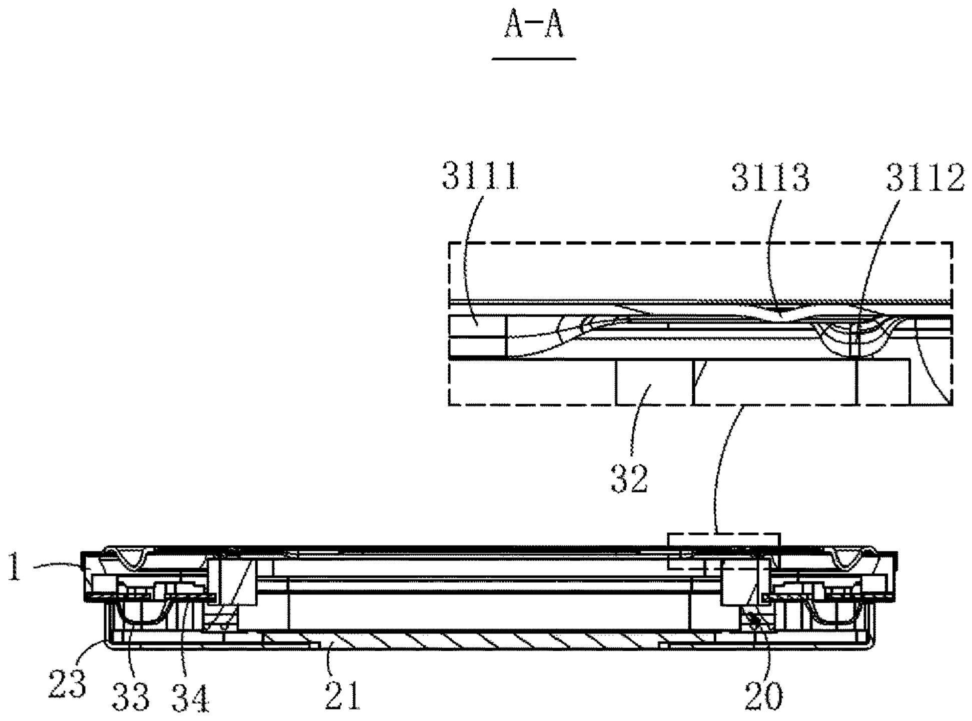
FIG. 3 is a cross-sectional view of the sound device taken along line A-A in FIG. 1.
Figure 4:
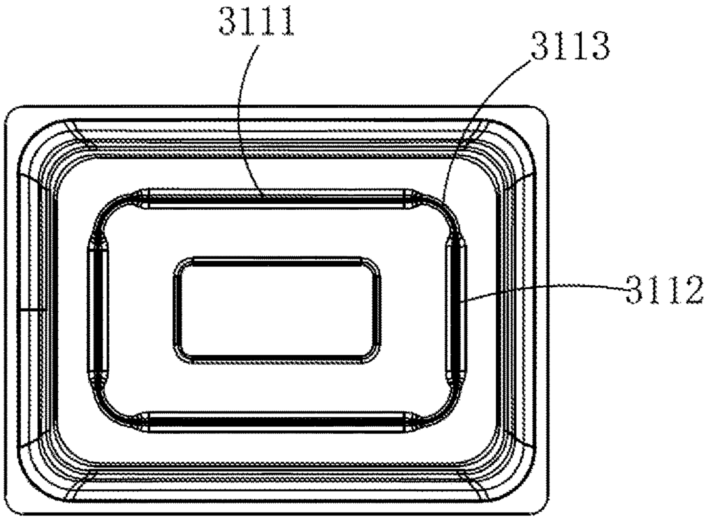
FIG. 4 is a top view of the sound device in FIG. 1.
Figure 5:
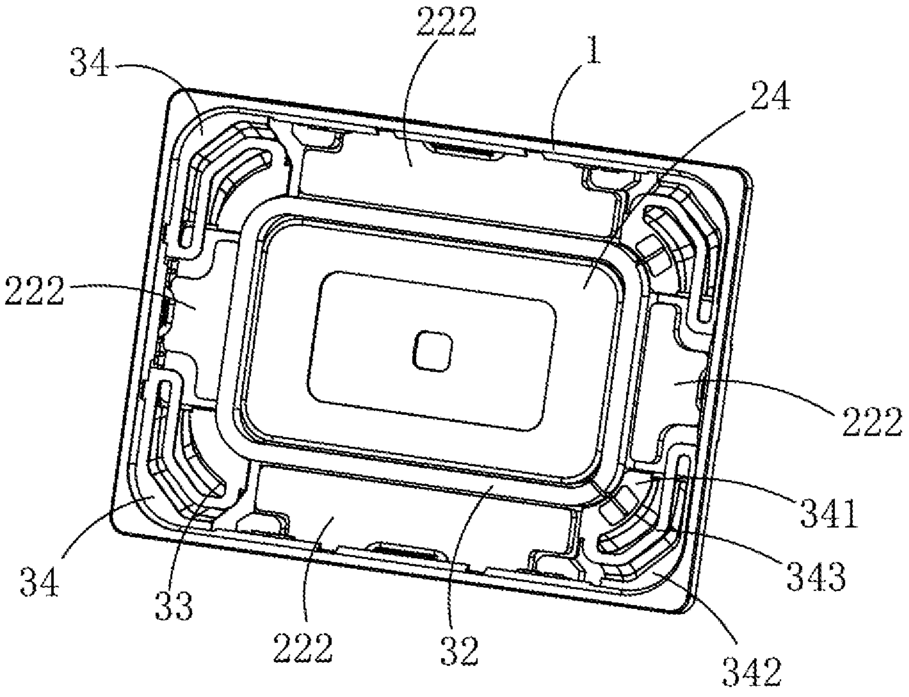
FIG. 5 is an exploded view of the sound device in FIG. 1.

Please refer to FIGS. 1-5 together, a sound device 100 provided by an exemplary embodiment of the present disclosure includes a frame 1, a magnet system 2 having a magnetic gap 20, and a vibration system 3 mounted on the frame 1.

The magnet system 2 includes a yoke 21 fixed to the frame 1, a magnet 22 fixed to the yoke 21, and a mental part 23 fixed to a bottom side of the yoke 21. In particular, the magnet 22 comprises a main magnet 221 located in a central position and a side magnet 222 spaced apart from the main magnet 221 forming the magnetic gap 20. The magnet system 2 further includes a main pole plate 24 fixed to the main magnet 221, and a side pole plate 25 mounted on one side of the side magnet 222 facing the vibration system 3;

the side pole plate 25 is fixed to the frame 1 to support the magnet system 2. In addition, the magnet system 2 comprises four side magnets 222 spaced apart from each other and arranged on side of the main magnet 221.

The vibration system 3 includes a diaphragm 31 fixed to the frame 1, a coil 32 fixed to the diaphragm 31 and inserted into the magnetic gap 20, a support diaphragm 33 fixed one end of the coil 32 away from the diaphragm 31, and a FPC 34 located on one side of the support diaphragm 33 facing the diaphragm 31. The support diaphragm 33 is arranged between adjacent two side magnets 222. Furthermore, the FPC 34 includes a first fixation portion 341 located outside the coil 32, a second fixation portion 342 fixed to the frame 1, and an elastic portion 343 connecting the first fixation portion 341 with the second fixation portion 342. It can be understood that the vibration system 3 includes four FPCs 34; two solder pads are separately provided on two first fixation portions 341 of the FPCs 34. And a solder pad is provided on the second fixation portion 342 to electrically connect with an external circuit to provide power supply to the coil 32.

Specifically, the diaphragm 31 includes a rectangular dome 311 and an edge 312 surrounding the dome 311; the dome 311 includes a first protrusion 3111, a second protrusion 3112 and a third protrusion 3113 recessed towards the coil 32; the first protrusion 3111 extends along a long axis of the dome 311; the second protrusion 3112 extends along a short axis of the dome 311; two ends of the third protrusion 3113 connects with the first protrusion 3111 and the second protrusion 3112, respectively; the coil 32 is fixed to the first protrusion 3111 and the second protrusion 3112. The third protrusion 3113 is located at the corner position and in an arc shape. The first protrusion 3111 and the second protrusion 3112 are served as a coil frame and configured to suspend the coil 32 into the magnetic gap 20, thus decreasing the cost of the sound device 100 and improving the vibration stability of the coil 32. Besides, the third protrusion 3113 arranged between the first protrusion 3111 and the second protrusion 3112 can effectively reduce the risk of fracture of the dome during vibration deformation and improve the stability of the sound device.

Furthermore, the dome 311 includes four third protrusions 3113; the third protrusion 3113 is located between adjacent first protrusion 3111 and the second protrusion 3112. Thus, the first protrusion 3111, the second protrusion 3112 and the third protrusion 3113 are enclosed in a rectangular shape, hence increasing the strength of the dome 311.

A concave depth of the third protrusion 3113 along a vibration direction is smaller than a concave depth of the first protrusion 3111 and a concave depth of the second protrusion 3112 along the vibration direction. In this manner, the third protrusion 3113 can better reduce the risk of fracture of the dome 311.

Compared with the related art, the sound device includes a frame, a magnet system having a magnetic gap, and a vibration system mounted on the frame; the vibration system includes a diaphragm fixed to the frame, and a coil fixed to the diaphragm and inserted into the magnetic gap; the diaphragm includes a rectangular dome and an edge surrounding the dome; the dome includes a first protrusion, a second protrusion and a third protrusion recessed towards the coil; the first protrusion extends along a long axis of the dome; the second protrusion extends along a short axis of the dome; two ends of the third protrusion connects with the first protrusion and the second protrusion, respectively; the coil is fixed to the first protrusion and the second protrusion. The third protrusion is located at the corner position and in an arc shape. The third protrusion arranged between the first protrusion and the second protrusion can effectively reduce the risk of fracture of the dome during vibration deformation and improve the stability of the sound device.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sound device comprising:
a frame;
a magnet system having a magnetic gap, comprising:
a yoke fixed to the frame; and
a magnet fixed to the yoke;
a vibration system mounted on the frame, comprising:
a diaphragm fixed to the frame; and
a coil fixed to the diaphragm and inserted into the magnetic gap; wherein
the diaphragm comprises a rectangular dome and an edge surrounding the dome;
the dome comprises two first protrusions opposite to each other and extending along a long axis of the dome, two second protrusions opposite to each other and extending along a short axis of the dome, and four third protrusions enclosed a rectangular shape with the two first protrusions and the two second protrusions; two ends of each of the four third protrusions connect with adjacent first protrusion and second protrusions; the two first protrusions, the two second protrusions and the four third protrusions are recessed towards the coil along a vibration direction of the diaphragm;
a concave depth of each of the four third protrusions along the vibration direction is smaller than a concave depth of each of the two first protrusions and a concave depth of each of the two second protrusions along the vibration direction; a surface of each of the two first protrusions closest to the magnet along the vibration direction and a surface of each of the two second protrusions closest to the magnet along the vibration direction are both fixed to a surface of the coil facing the diaphragm.

2. The sound device as described in claim 1, wherein the third protrusion is located at the corner position and in an arc shape.

3. The sound device as described in claim 1, wherein the magnet comprises a main magnet located in a central position and a side magnet spaced apart from the main magnet forming the magnetic gap.

4. The sound device as described in claim 3, wherein the magnet system further comprises a main pole plate fixed to the main magnet and a side pole plate mounted on one side of the side magnet facing the diaphragm; the side pole plate is fixed to the frame to support the magnet system.

5. The sound device as described in claim 3, wherein the magnet system comprises four side magnets spaced apart from each other; the vibration system further comprises a support diaphragm fixed one end of the coil away from the diaphragm; the support diaphragm is arranged between adjacent two side magnets.

6. The sound device as described in claim 5, wherein the vibration system further comprises a flexible printed circuit (FPC) located on one side of the support diaphragm facing the diaphragm; the FPC comprises a first fixation portion located outside the coil, a second fixation portion fixed to the frame and an elastic portion connecting the first fixation portion with the second fixation portion.

7. The sound device as described in claim 6, wherein the vibration system comprises four FPCs; two solder pads are separately provided on two first fixation portions of the FPCs.

* * * * *